(12) United States Patent
Shlaimoun et al.

(10) Patent No.: US 11,704,262 B2
(45) Date of Patent: Jul. 18, 2023

(54) SYSTEMS, APPARATUS, AND METHODS OF CONVEYOR BELT PROCESSING

(71) Applicant: Hexacore, Inc., Calabasas, CA (US)

(72) Inventors: Zia Shlaimoun, Northridge, CA (US); Nico Shlaimoun, Northridge, CA (US)

(*) Notice: Subject to any disclaimer, the term of this patent is extended or adjusted under 35 U.S.C. 154(b) by 0 days.

(21) Appl. No.: 17/639,730

(22) PCT Filed: Sep. 4, 2020

(86) PCT No.: PCT/US2020/070502
§ 371 (c)(1),
(2) Date: Mar. 2, 2022

(87) PCT Pub. No.: WO2021/046581
PCT Pub. Date: Mar. 11, 2021

(65) Prior Publication Data
US 2022/0334987 A1    Oct. 20, 2022

Related U.S. Application Data

(60) Provisional application No. 62/896,682, filed on Sep. 6, 2019.

(51) Int. Cl.
*G06F 13/20* (2006.01)
*G06F 8/41* (2018.01)
*G05B 19/4155* (2006.01)

(52) U.S. Cl.
CPC .......... *G06F 13/20* (2013.01); *G06F 2213/40* (2013.01)

(58) Field of Classification Search
CPC .......................... B65G 43/08; E01C 23/088
See application file for complete search history.

(56) References Cited

U.S. PATENT DOCUMENTS

| | | | |
|---|---|---|---|
| 7,844,758 B1 | 11/2010 | Hughes | |
| 11,420,828 B1 * | 8/2022 | Cerra | B65G 47/31 |
| 2011/0179252 A1 | 7/2011 | Master | |
| 2012/0245916 A1 | 9/2012 | Zeidman | |
| 2014/0215245 A1 | 7/2014 | Zhang et al. | |
| 2018/0143777 A1 | 5/2018 | Dasu et al. | |
| 2019/0105800 A1 * | 4/2019 | Xie | B28D 1/24 |
| 2019/0135551 A1 * | 5/2019 | Sekich | B65G 43/00 |
| 2019/0193946 A1 * | 6/2019 | DeVries | G01M 13/00 |
| 2019/0315570 A1 * | 10/2019 | Nemati | G07F 11/165 |
| 2019/0367286 A1 * | 12/2019 | Engelmann | E01C 23/088 |

* cited by examiner

*Primary Examiner* — Getente A Yimer
(74) *Attorney, Agent, or Firm* — Daniel M. Cohn; Howard M. Cohn

(57) ABSTRACT

A reconfigurable hardware platform uses, in place of a portion of software, a chain of reconfigurable hardware Operator Blocks to manipulate data as the data moves down the chain. This conveyor belt architecture, or chain of Operator Blocks, moves data from Operator Block to Operator Block. This conveyor belt architecture processor may be combined with a conventional front-end processor to process complex information or critical loops in hardware while processing a rest of a program as software.

20 Claims, 15 Drawing Sheets

```
% cat fib.c
include <stdio.h> int main (void) {
    int x, y, z;

While (1) {
        x = 0;
        y = 1;

do {
            printf("%d\n"
            z = x + y;
            x = y;
            y = z;
        } while (x < 255);
    }
}
```

FIG. 3

| C Source Code | Memory Location | Instruction | Operands | CPU Cycles First Iteration | CPU Cycles Subsequent Iterations |
|---|---|---|---|---|---|
| Initialize | 0000000100000f20 | pushq | %rbp | 1 | |
| | 0000000100000f21 | movq | %rsp, %rbp | 3 | |
| | 0000000100000f24 | subq | $0x20, %rsp | 4 | |
| x = 0; | 0000000100000f28 | movl | $0x8, -0x4(%rbp) | 7 | |
| y = 1; | 0000000100000f2f | movl | $0x0, -0x8(%rbp) | 7 | |
| | 0000000100000f36 | movl | $0x1, -0xc(%rbp) | 7 | |
| printf("%d\n", x); | 0000000100000f3d | leaq | 0x56(%rip), %rdi | 7 | 7 |
| | 0000000100000f44 | movl | -0x8(%rbp), %esi | 7 | 7 |
| | 0000000100000f47 | movb | $0x8, %al | 3 | 3 |
| | 0000000100000f49 | callq | 0x100000f78 | 2 | 2 |
| z = x + y; | 0000000100000f4e | movl | -0x8(%rbp), %esi | 7 | 7 |
| | 0000000100000f51 | addl | -0xc(%rbp), %esi | 2 | 2 |
| | 0000000100000f54 | movl | %esi, -0x10(%rbp) | 3 | 3 |
| x = y; | 0000000100000f57 | movl | -0xc(%rbp), %esi | 3 | 3 |
| | 0000000100000f5a | movl | %esi, -0x8(%rbp) | 3 | 3 |
| y = z; | 0000000100000f5d | movl | -0x10(%rbp), %esi | 3 | 3 |
| | 0000000100000f60 | movl | %esi, -0xc(%rbp) | 3 | 3 |
| } while (x < 255); | 0000000100000f63 | movl | %eax, -0x14(%rbp) | 3 | 3 |
| | 0000000100000f66 | cmpl | $0xff, -0x8(%rbp) | 3 | 3 |
| | 0000000100000f6d | jl | 0x100000f3d | 7 | 7 |
| } | 0000000100000f73 | jmp | 0x100000f2f | | |
| | | | | 85 | 56 |

FIG. 4

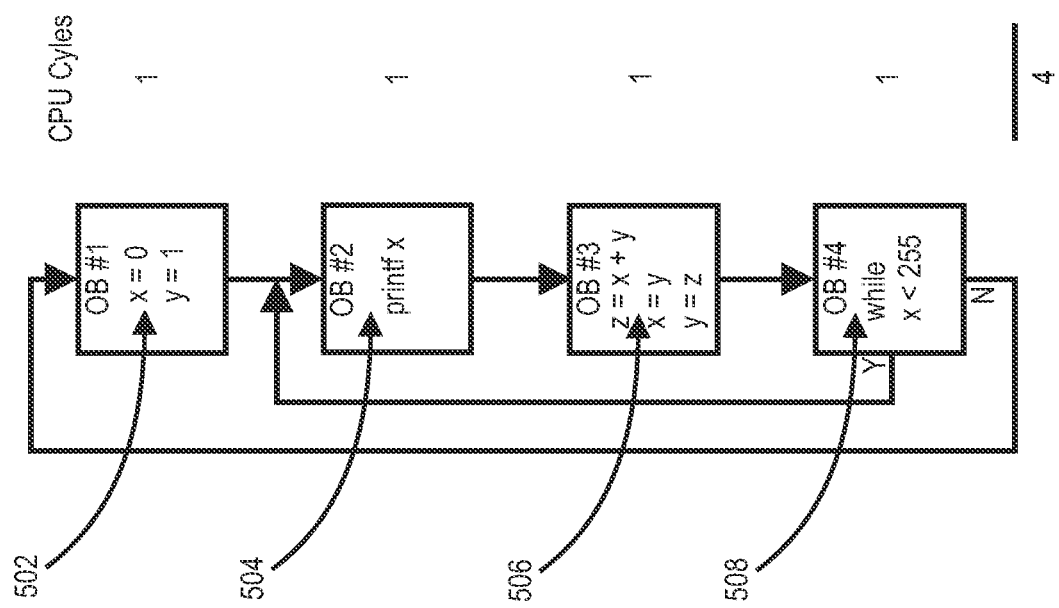

```
#include <stdio.h>
int sum (int a);

int main()
{
    int num, result;
    printf("Enter the number: ");
    scanf("%d", &num);
    result = sum(num);
    printf("Sum of digits in %d is %d\n", num, result);
    return 0;
} int sum (int num)
{
    if (num != 0)
    {
        return (num % 10 + sum (num / 10));
    }
    else
    {
        return 0;
    }
}
```

FIG. 6

| C Source Code | Memory Location | Instruction | Operands | Cycles If Statement = True | Cycles If Statement = False |
|---|---|---|---|---|---|
| Initialize | | .LC0: | | | |
| | | .string "Enter the number:" | | | |
| | | .LC1: | | | |
| | | .string "%d" | | | |
| | | .LC2: | | | |
| | | .string "Sum of digits in %d is %d\n" | | | |
| | | main: | | | |
| { | 4005d2 | push | rbp | 1 | 1 |
| | 4005d3 | mov | rbp, rsp | 3 | 3 |
| | 4005d6 | sub | rsp, 16 | 4 | 4 |
| | 4005da | mov | edi, OFFSET FLAT:. | 5 | 5 |
| printf("Enter the number:"); | 4005df | mov | eax, 0 | 5 | 5 |
| | 4005e4 | call | printf | 5 | 5 |
| | 4005e9 | lea | rax, [rbp-8] | 4 | 4 |
| | 4005ed | mov | rsi, rax | 2 | 2 |
| scanf("%d", &num); | 4005f0 | mov | edi, OFFSET FLAT:. | 5 | 5 |
| | 4005f5 | mov | eax, 0 | 5 | 5 |
| | 4005fa | call | scanf | 5 | 5 |
| ... | | | | | |

FIG. 7

```
...
result = sum(num);                  4005ff    mov    eax, DWORD PTR [r    2
                                    400602    mov    edi, eax              2
                                    400604    call   sum(int)              5
                                    400609    mov    DWORD PTR [rbp-4]     3
                                    40060c    mov    eax, DWORD PTR [r    3
                                    40060f    mov    edx, DWORD PTR [r    3
printf("Sum of digits in %d is %d\n", nur  400612  mov  esi, eax            2
                                    400614    mov    edi, OFFSET FLAT..    5
                                    400619    mov    eax, 0                5
                                    40061e    call   printf                4
return 0;                           400623    mov    eax, 0                5
                                    400628    leave                        1
}                                   400629    ret                          1

{                                   sum(int):
                                    40062a    push   rbp                   1
                                    40062b    mov    rbp, rsp              3
                                    40062e    push   rbx                   1
                                    40062f    sub    rsp, 24               3
...                                 400633    mov    DWORD PTR [rbp-2(    2

5  2
                                                                                      ▲
                                                                                      |
                                                                                      |
...                                                                                   |
if (num != 0)                                                                         |
return (num % 10 + sum (num / 10));
                    400635
              902   400063a    cmp     DWORD PTR [rbp-20]
                    40063c     je      L4
                    40063f     mov     edx, DWORD PTR [rbp-20]
                    400642     movsx   rax, edx
                    400649     imul    rax, rax, 1717986919
                    40064d     shr     rax, 32
                    40064f     mov     ecx, eax
                    400652     sar     ecx, 2
                    400654     mov     eax, edx
                    400657     sar     eax, 31
                    400659     sub     ecx, eax
                    40065b     mov     ebx, ecx
                    40065d     mov     eax, ebx
                    400660     sal     eax, 2
                    400662     add     eax, ebx
                    400664     add     eax, eax
                    400665     mov     ebx, edx
                    400668     sub     ebx, eax
                    40066b     mov     eax, DWORD PTR [rbp-20]
                    40066b     movsx   rdx, eax
                    40066e     imul    rdx, rdx, 1717986919
return (num % 10 + sum (num / 10));
...
```

FIG. 9

SYSTEMS, APPARATUS, AND METHODS OF CONVEYOR BELT PROCESSING

TECHNICAL FIELD

The present disclosure relates to computers and more specifically to computer processors.

BACKGROUND

Digital computers designed for universal computing may use a Standard Architecture such as a von Neumann Architecture. Designed in around 1945 by physicist and mathematician John von Neumann, a von Neumann Architecture machine can be a theoretical design for a stored-program digital computer.

BRIEF DESCRIPTION OF THE DRAWINGS

FIG. 3 shows program source code that prints Fibonacci numbers.

FIG. 4 shows program machine code that executes on a Standard Architecture system for printing Fibonacci numbers.

FIG. 5 shows a flow diagram of operator blocks that execute on a conveyor belt architecture system for printing Fibonacci numbers.

FIG. 6 shows source code that computes and prints out a sum of digits.

FIG. 7 shows first quarter of machine code that executes on a Standard Architecture system that computes and prints out a sum of digits.

FIG. 8 shows second quarter of machine code that executes on a Standard Architecture system that computes and prints out a sum of digits.

FIG. 9 shows third quarter of machine code that executes on a Standard Architecture system that computes and prints out a sum of digits.

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that use a reconfigurable hardware platform to interconnect a chain of reconfigurable hardware Operator Blocks to manipulate data as the data moves down the chain. This conveyor belt architecture, or chain of Operator Blocks, moves data from Operator Block to Operator Block. In place of a portion of software, the chain of reconfigurable hardware Operator Blocks may manipulate data as the data moves down the chain.

In some embodiments, a conveyor belt architecture computing system may be used singularly to perform computing tasks.

Multiple conveyor belt architecture computing systems may be used in series or in parallel, for example, to share the workload between computing systems.

A conveyor belt architecture computing system may be used in combination with a Standard Architecture computing system, for example, the workload may be shared between the computing systems.

Multiple conveyor belt architecture computing systems may be used in series or in parallel and used in combination with a Standard Architecture computing system, for example, to share the workload between the computing systems.

A conveyor belt architecture computing system may be used in combination with a plurality of Standard Architecture computing systems, for example, and the workload shared between the computing systems.

Figure 1:
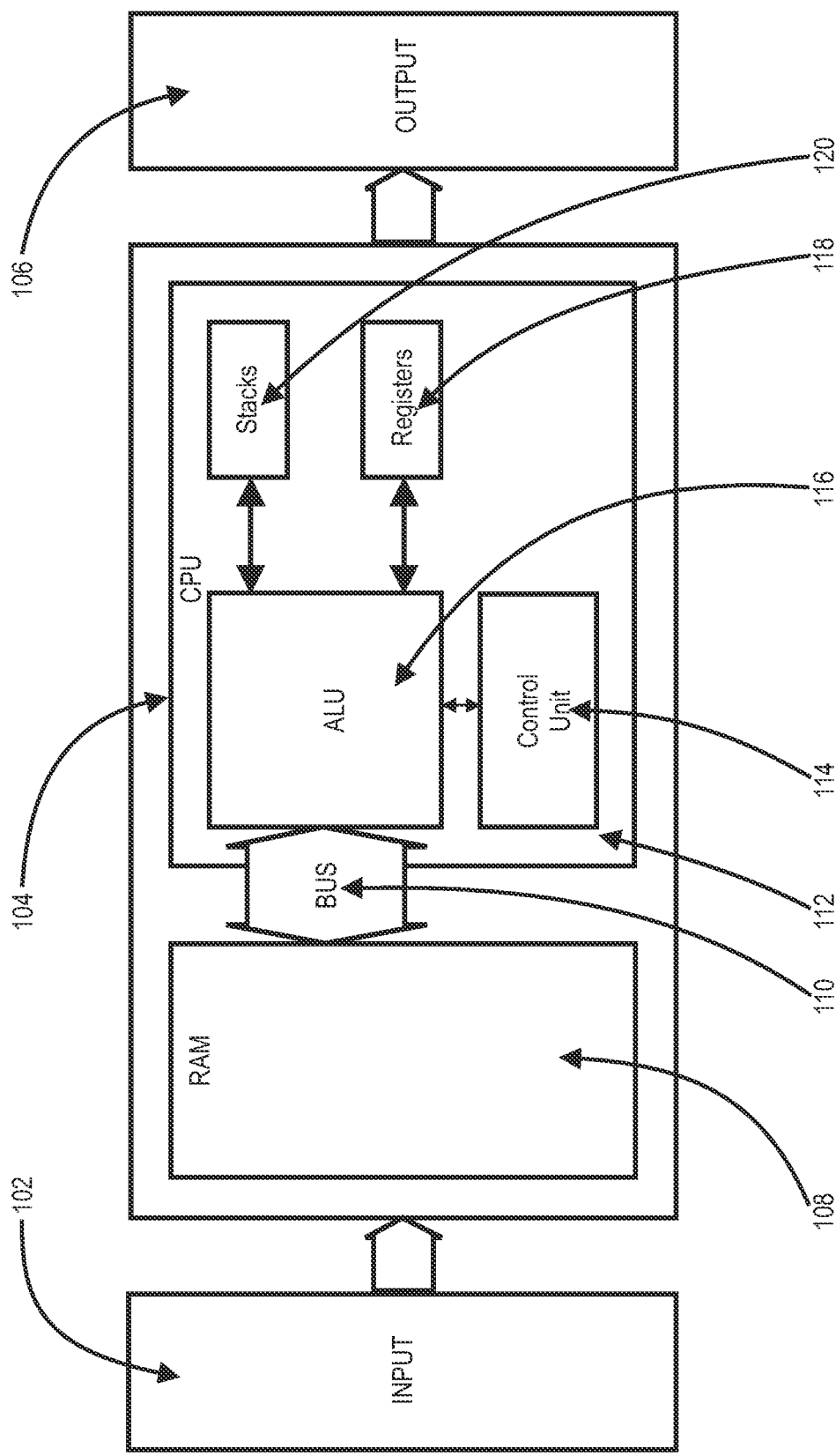
FIG. 1 shows a diagram illustrating an example of a computing system.

FIG. 1 shows a diagram illustrating an example of computing system similar to or comprising a von Neumann architecture computing system. The computing system comprises an Input 102, a Computing System 104 and an Output 106. An Input 102 is received (e.g., via a bus, etc.) to the Computing System 104, where it is processed before being sent (e.g., via a bus, etc.) from the Computing System 104 as an Output 106. Within the Computing System 104 is contained Random Access Memory (RAM) 108, that is coupled to a Central Processing Unit (CPU) 112 via a common Bus 110. Further, the CPU 112 comprises an Arithmetic Logic Unit (ALU) 116, a Control Unit 114, and Registers 118 and Stacks 120.

Programs that execute on a Standard Architecture computing system may comprise a set of instructions that are executed in a particular sequence to manipulate data.

Once a program is loaded into RAM 108, a CPU 112 may carry out a series of 'Fetch-Decode-Execute' cycles, whereby the content of RAM 108 locations are read, deciphered and then executed in a particular sequence, as dictated by the program. Since locations in RAM 108 contain instructions and data, the CPU 112 reads and deciphers instructions to determine what to do with the information and then execute on the outcome. Some instructions tell the CPU 112 to write back the result of an operation into a RAM 108 location and other instructions tell the CPU 112 to jump to a particular location in RAM 108, depending on the result of a previous instruction.

A problem with this architecture may be that program instruction and data are contained in the same RAM 108. Information in RAM 108 may be read one at a time and deciphered leading to inefficiencies in the architecture and performance limitation. Furthermore, the common Bus 110 may not allow the CPU 112 to read and write information at the same time. This is referred to as a bottleneck and may limit the performance of the system even further.

Figure 2:
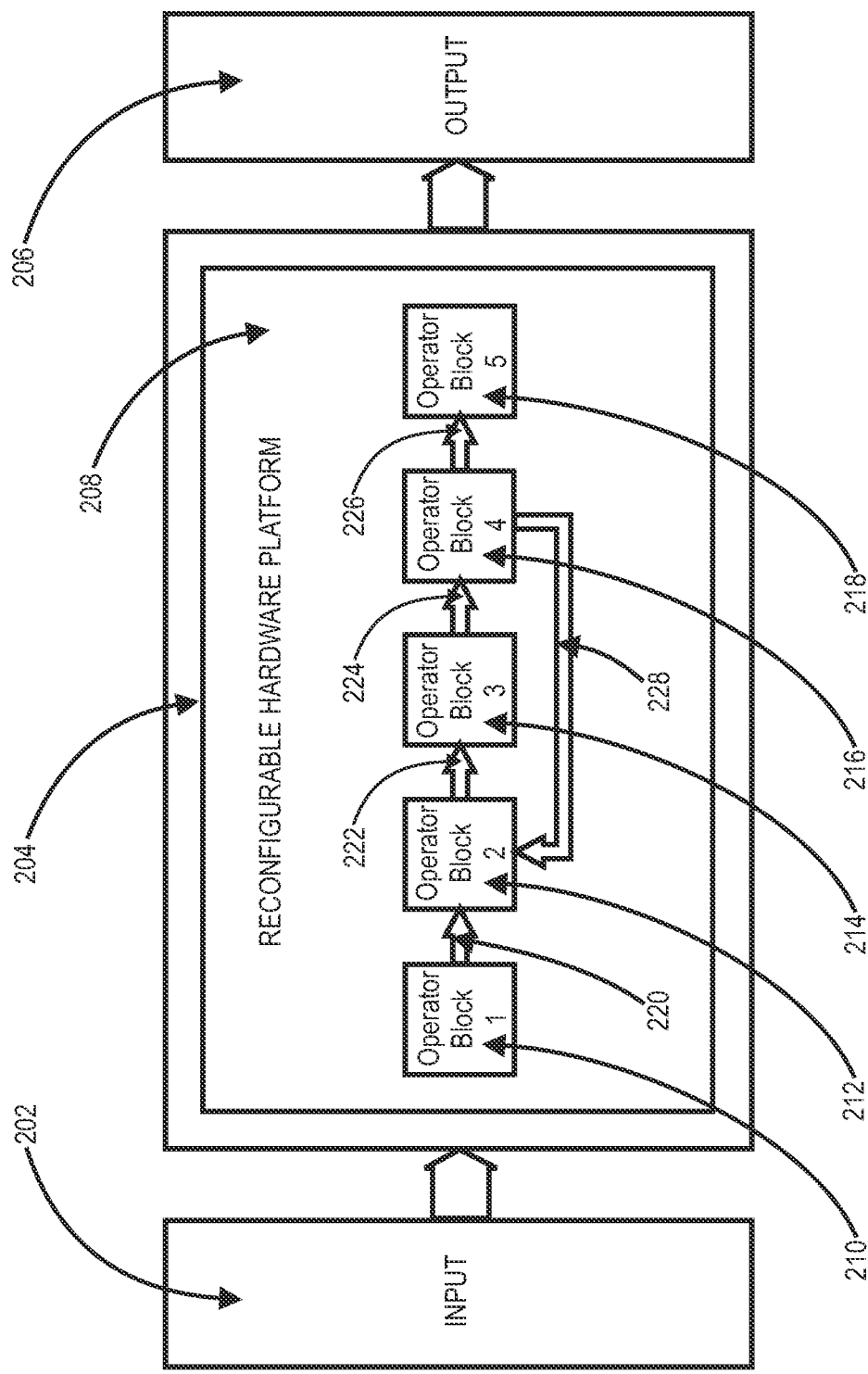
FIG. 2 shows a diagram illustrating a conveyor belt architecture computing system.
Figure 10:
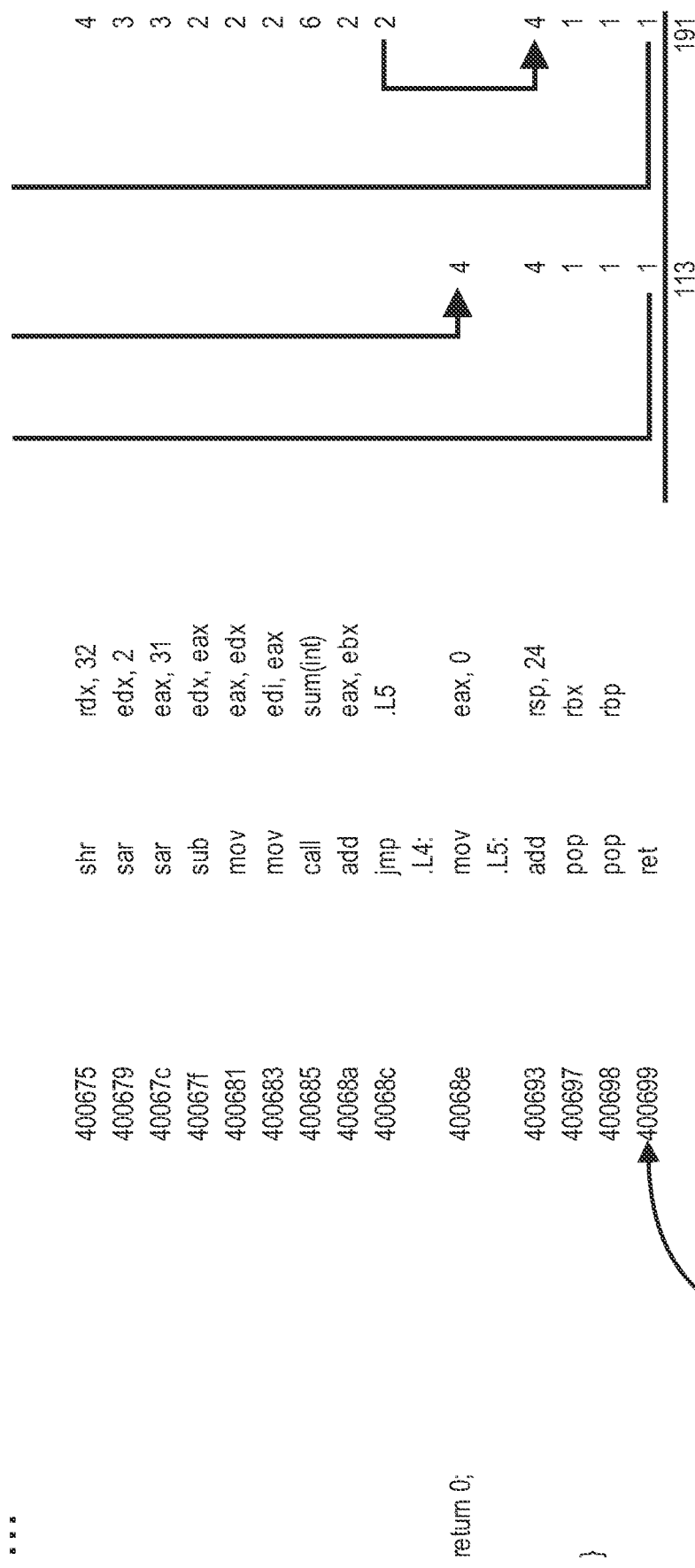
FIG. 10 shows fourth quarter of machine code that executes on a Standard Architecture system that computes and prints out a sum of digits.
Figure 11:
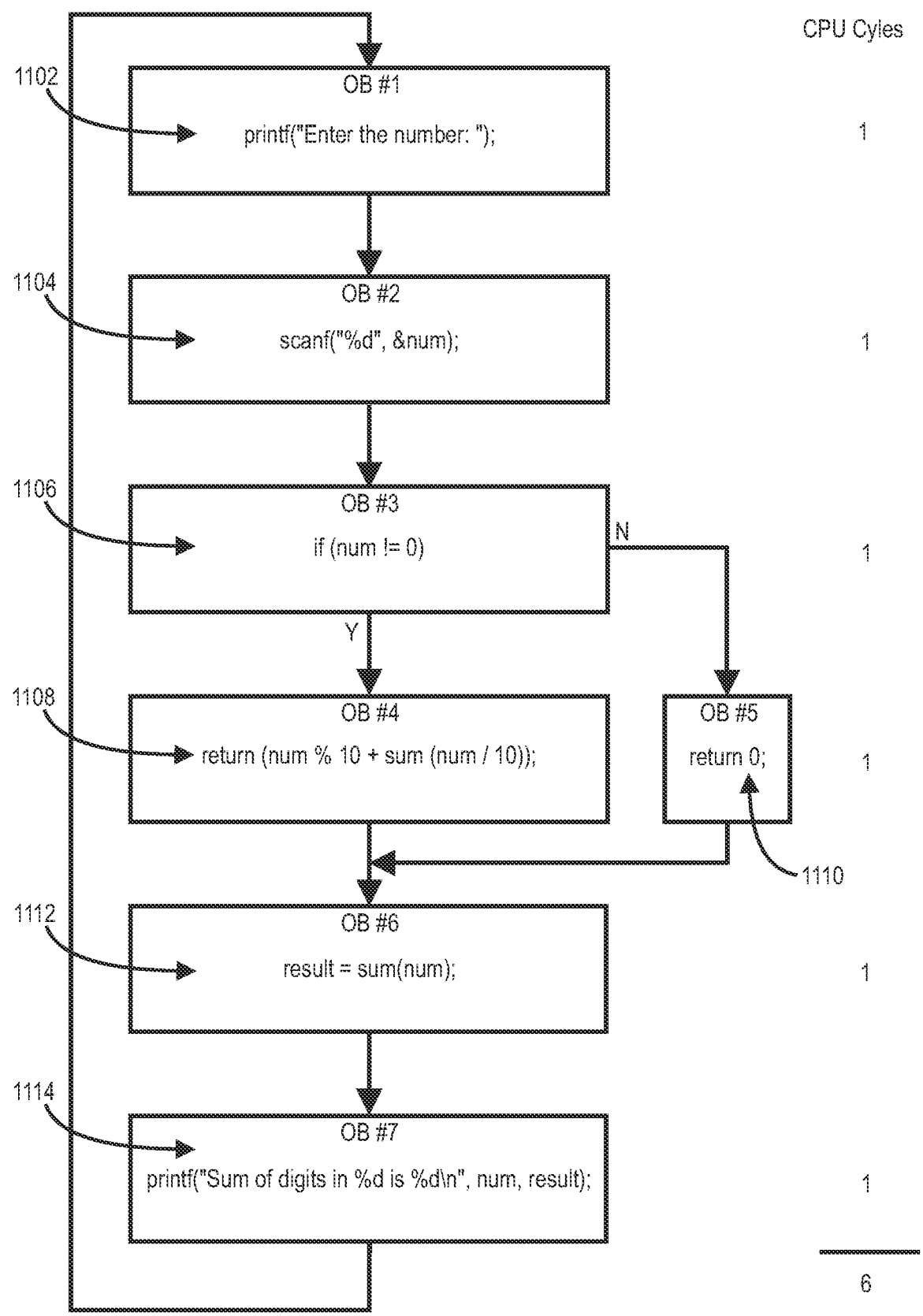
FIG. 11 shows a flow diagram of operator blocks that execute on a conveyor belt architecture system that computes and prints out a sum of digits.

FIG. 2 shows a diagram illustrating a conveyor belt architecture computing system comprising an Input 202, a Computing System 204 and an Output 206. An Input 202 is received (e.g., via a bus, etc.) by the Computing System 204, where it is processed before being sent (e.g., via a bus, etc.) from the Computing System 204 as an Output 206. Within the Computing System 204 is contained a reconfigurable hardware platform 208 (for example, a Field Programmable Gate Array (FPGA)) that contains a multitude of reconfigurable Operator Blocks 210, 212, 214, 216 and 218 that are interconnected by means of data pathways 220, 222, 224 and 226 in one direction and a data pathway 228 in the opposite direction.

Instead of a CPU coupled to RAM via a Bus, Conveyor Belt Architecture may use a reconfigurable hardware platform such as a FPGA 208 to interconnect a chain of reconfigurable Operator Blocks 210, 212, 214, 216 and 218 to manipulate data as the data moves down the chain, from Operator Block to Operator Block across data pathways 220, 222, 224 and 226 in one direction and a data pathway 228 in the opposite direction.

In the embodiment, at each Operator Block 210, 212, 214, 216 and 218 an operation, or group of operations, is carried out to manipulate the Data before the Data is carried to the next Operator Block in the chain across data pathways 220, 222, 224 and 226 in one direction and a data pathway 228 in the opposite direction.

A program is translated and then copied into a reconfigurable hardware platform 208 (e.g., an FPGA, etc.). Each instruction, or group of instructions, is assigned to an Operator Block 210, 212, 214, 216 and 218 and program flow is determined by the interconnection of these Operator Blocks.

Data is manipulated at each Operator Block 210, 212, 214, 216 and 218, as it flows down the chain from Operator Block to Operator Block across data pathways 220, 222, 224 and 226.

In the case of a 'jump' instruction, Data flow can be altered/redirected by the Operator Block in an opposite direction or to some other Operator Block by way of a separate data pathway 228. In this example a jump based on a condition being met is shown in Operator Block 4 (216) back to Operator Block 2 (212).

Furthermore, an Operator Block 210, 212, 214, 216 and 218 may be autonomous and able to process Data either asynchronously or synchronously, as it receives it from the previous Operator Block in the chain.

In one embodiment of autonomous operation, Conveyor Belt Architecture allows multiple instructions to be executed in a single processor cycle.

A Conveyor Belt Architecture may be more efficient than Standard Architecture because it does not require the program to be read from RAM and deciphered.

A Conveyor Belt Architecture may avoid bottlenecks associated with conventional computer architectures because it does not rely upon a common Bus pathway and each set of Operator Blocks has its own data pathway.

A Conveyor Belt Architecture may allow higher throughput and processing power. An additional advantage of this architecture is that operating in a synchronous mode, Conveyor Belt architecture may be able to pack Data more densely into the Reconfigurable Hardware Platform by queuing Data at each Operator Block input, ready to be loaded into a subsequent Operator Block as it becomes available.

The program instructions may be contained within Operator Blocks in the form of hardware logic gates, rather than software, making instruction execution much faster than a software counterpart.

Another benefit of the Conveyor Belt architecture is that a program may be harder to hack. The program may be stored as hardware and any modification of the program by a hacker may break a chain of the Conveyor Belt and result in a system reset. The system reset may cause the original (unaltered) program to be automatically reloaded by the system into the reconfigurable hardware platform.

FIGS. 3-11 demonstrate differences between the two architectures. The C Source code and compiled outputs from both a more traditional computing system and a Conveyor Belt Computing System are examined for two different programs.

FIG. 3 shows source code for printing Fibonacci numbers. C Source code is shown for a program used to print out Fibonacci numbers in the range 0 to 255.

FIG. 4 shows machine code for printing Fibonacci numbers. The C source code from FIG. 3 may be compiled to execute on a traditional Computing System. The resulting machine language may look similar to the listing shown in FIG. 4. The traditional Computing System may use at least 85 cycles of the CPU clock to complete the first iteration of the calculation and print loop. Thereafter the traditional Computing System may use at least 56 CPU cycles to complete subsequent iterations of the calculation and print loop.

FIG. 5 shows a flow diagram of Operator Blocks for printing Fibonacci numbers. In comparison to FIG. 4, the C source code shown in FIG. 3 may be compiled to execute on a Conveyor Belt Computing System. The resulting Operator Blocks used to execute the program may look similar to those shown in FIG. 5.

Operator Block 1 (OB #1) 502 assigns the values 'x=0' and 'y=1.' Operator Block 2 (OB #2) 504 carries out the 'printf' function. Operator Block 3 (OB #3) 506 adds the content of x and y and assigns it to variable z. It also assigns y to x and z to y. Operator Block 4 (OB #4) 508 carries out a conditional jump back to the start of Operator Block 2 504, if the result of 'x<255' is true and back to the start of Operator Block 1 502, if the result of 'x<255' is false.

In this embodiment, numerous instructions can be grouped together in a single Operator Block 502, 504, 506 and 508, allowing multiple operations to be conducted on data before the data is passed to the next Operator Block. When operating in synchronous mode, the Conveyor Belt Architecture may use four processor clock cycles to complete the first and subsequent iterations of the calculation and print loop. This may allow the Conveyor Belt architecture machine in this example to operate at a factor of 14 times faster than the conventional machine with a similar clock cycle (i.e., 56 cycles versus 4 cycles).

FIG. 6 shows source code for finding a sum of digits. The C Source code for a program to find the sum of digits of a number using recursion is shown in FIG. 6.

FIGS. 7-10 show machine code for finding a sum of digits. The C source code from FIG. 6 may be compiled to execute on a von Neumann Computing System. The resulting machine language may look similar to the listings shown in FIGS. 7-10. The 'main' loop calls a separate 'sum' loop 802 to calculate and return a result 1002. Within the sum loop, there is contained an 'if' statement 902. Depending on the result of the if statement, the digital computer may use either 113 CPU clock cycles or 191 cycles of the clock cycle to process a single iteration.

FIG. 9 shows a flow diagram of Operator Blocks for finding a sum of digits. In comparison to FIGS. 7-10, the C source code shown in FIG. 6 may be compiled to execute on a Conveyor Belt Architecture Computing System. The resulting Operator Blocks used to execute the program may look similar to those shown in FIG. 11.

Operator Block 1 (OB #1) 1102 carries out a 'printf' function to print on an output device "Enter the number." Operator Block 2 (OB #2) 1104 carries out a 'scanf' function to input a number from the input device. Operator Block 3 (OB #3) 1106 carries out an 'if' statement that compares the inputted number to 0 and then redirect the program to either Operator Block 4 (OB #4) 1108, if the result is positive or to Operator Block 5 (OB #5) 1110, if the result is negative. Operator Block 4 (OB #4) 1108 carries out the calculation. Operator Block 5 (OB #5) 1110 returns a 0. Operator Block 6 (OB #6) 1112 assigns the number returned by either OB #4 (1108) or OB #5 (1110) to the variable 'sum.' Operator Block 7 (OB #7) 1114 carries out a 'printf' function to print sum on an output device. Further, the output of this Operator Block 1114 is coupled to the input of OB #1 (1102) to allow the program to be looped indefinitely.

In this embodiment, an Operator Block can redirect the program chain depending on the result of a condition. Operating in synchronous mode, the Conveyor Belt Architecture Computing System may use six processor clock cycles to complete an iteration of the program, regardless of the result of the 'if' instruction. The Conveyor Belt Architecture Computing System in this example may have a factor of 18 times faster than the Standard Architecture Computing System for a similar clock cycle (i.e., 113 cycles versus 6 cycles).

The Conveyor Belt Architecture Computing System may be significantly faster than a Standard Architecture Computing System depending on the application. For example, the Conveyor Belt Architecture Computing System may be faster in applications whereby large amounts of data are processed. A performance advantage of the Conveyor Belt Architecture Computing System has over a Standard Architecture Computing System may depend on a program being executed. It has been noticed through testing that an advantage of 100% to 2,000% is possible in some applications.

Figure 12:
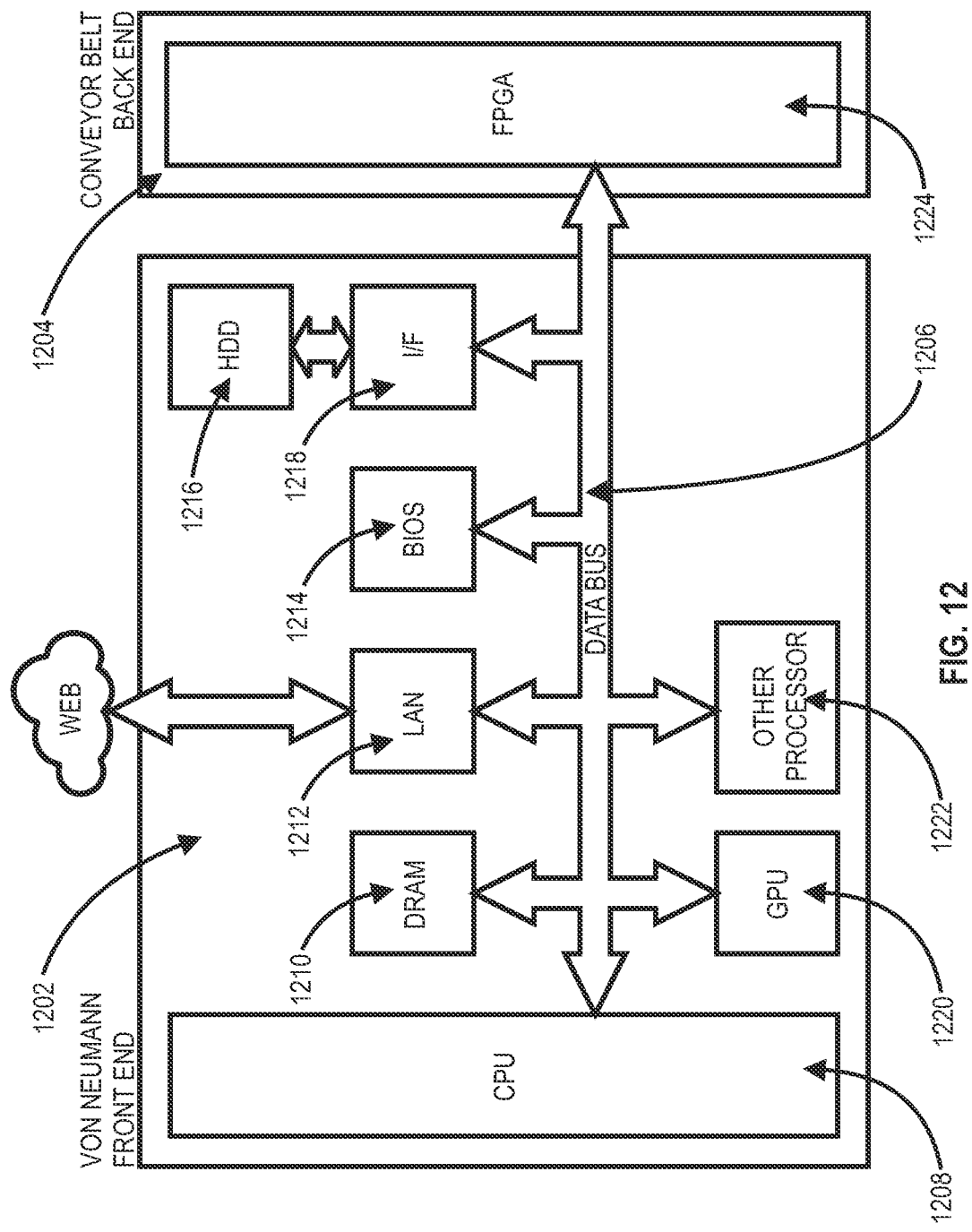
FIG. 12 shows a block diagram illustrating a conveyor belt architecture computing system used in combination with a Standard Architecture computing system.

FIG. 12 shows a block diagram illustrating a Conveyor Belt Architecture Computing System used in combination with a Standard Architecture Computing System. In this embodiment the Standard Architecture Computing System front end 1202 couples to the Conveyor Belt Architecture Computing System back end 1204 via a common Bus 1206.

The Standard Architecture Computing System front end comprises the following components; a Central Processing Unit (CPU) 1208, Dynamic Random Access Memory (DRAM) 1210, Local Area Network (LAN) adapter 1212, Basic Input and Output System (BIOS) 1214 and a hard disk drive (HDD) 1216, coupled together via a common Bus arrangement 1206. In the case of the HDD 1216, this is via an Interface (I/F) 1218.

Also shown in this embodiment are a graphic processor unit (GPU) 1220 and a further expansion processor 1222.

The Conveyor Belt Architecture Computing system belt back end incorporates a FPGA 1224 that couples to the rest of the components in the overall system by way of a common Bus 1206.

Since some programs may sit idle for a significant portion of operating times, it makes little sense to execute this idle code in the Conveyor Belt Architecture Computing System. Instead, only specific sections of the program (e.g., critical loops, critical paths) may be translated and execute in the Conveyor Belt Architecture Computing System to carry out the 'heavy lifting.' The remainder of the program without the specific sections may still be executed in the front-end Standard Architecture Computing Systems. Usage of the two architectures together may avoid a necessity for an entire program to be translated to operate on a Conveyor Belt Architecture Computing System. This may prevent usage of valuable Conveyor Belt Architecture Computing System real estate (e.g., program space) that may not provide any tangible benefit. Furthermore, usage of the two architectures ensures compatibility with existing programs that are designed to execute on a Standard Architecture Computing System.

Figure 13:
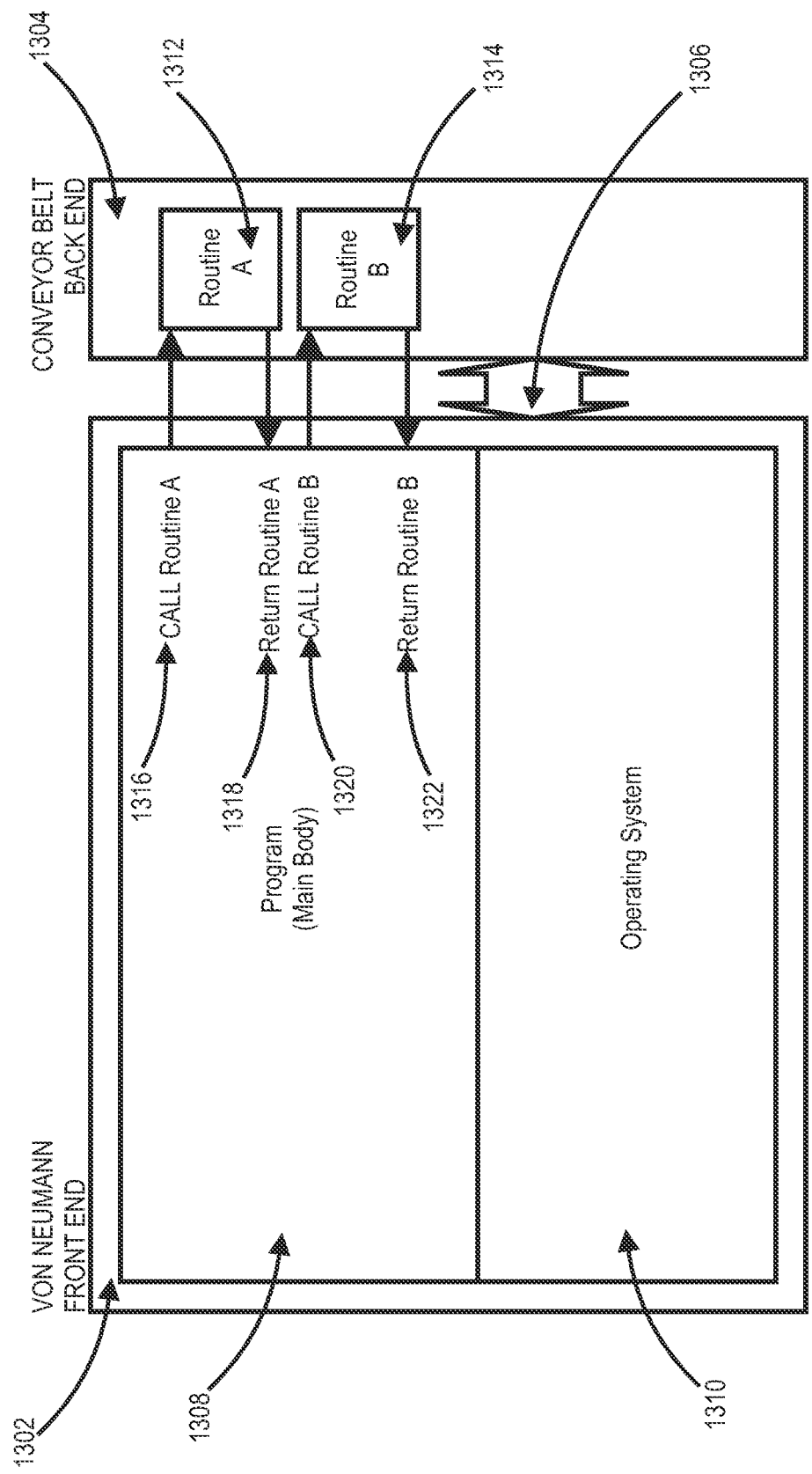
FIG. 13 shows a block diagram illustrating how a program may be executed across a conveyor belt architecture computing system and a Standard Architecture computing system.

In some embodiments, the Conveyor Belt Architecture Computing System may be used in conjunction with Standard Architecture Computing Systems. FIG. 13 shows a block diagram illustrating how a program may be executed across a Conveyor Belt Architecture Computing System and a Standard Architecture Computing Systems. A Standard Architecture Computing System front end 1302 couples to a Conveyor Belt Architecture Computing System back end 1304 via a Bus 1306. The main body of the program 1308 then calls Routine A 1312 and Routine B 1314 Conveyor Belt Architecture Computing System via call functions 1316 and 1320 and returns the results at 1318 and 1322 respectively.

Figure 14:
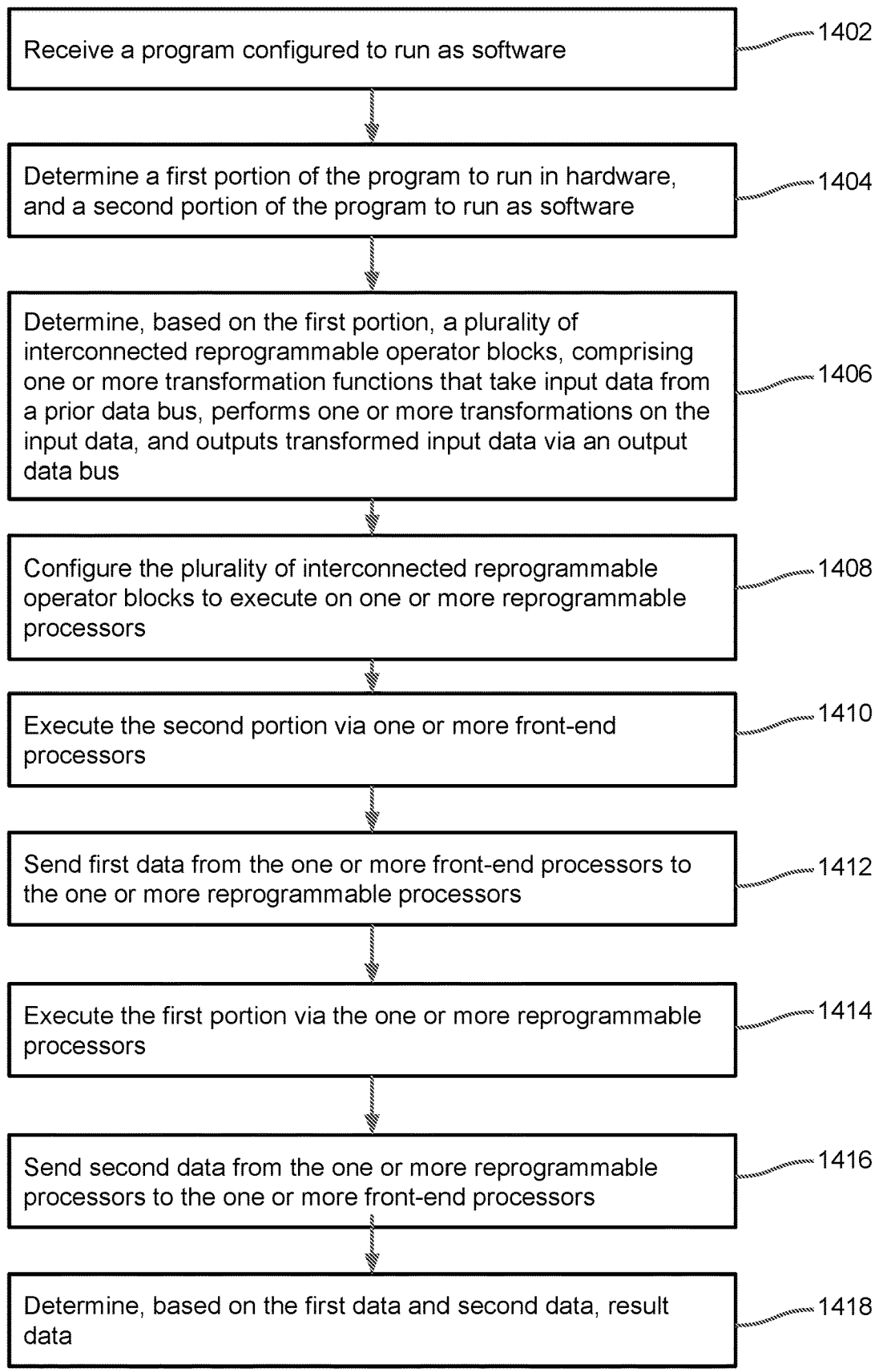
FIG. 14 shows a flowchart of a method for preparing a conveyor belt architecture.

FIG. 14 shows a flowchart of a method for preparing a conveyor belt architecture. The method may be performed by systems and/or components described herein, including 204 from FIG. 2. In block 1402, a conveyor belt system may receive a program configured to run as software. In block 1404, the conveyor belt system may determine a first portion of the program to run in hardware, and a second portion of the program to run as software. In block 1406, the conveyor belt system may determine, based on the first portion, a plurality of interconnected reprogrammable operator blocks, comprising one or more transformation functions that take input data from a prior data bus, performs one or more transformations on the input data, and outputs transformed input data via an output data bus. In block 1408, the conveyor belt system may configure the plurality of interconnected reprogrammable operator blocks to execute on one or more reprogrammable processors. In block 1410, the conveyor belt system may execute the second portion via one or more front-end processors. In block 1412, the conveyor belt system may send first data from the one or more front-end processors to the one or more reprogrammable processors. In block 1414, the conveyor belt system may execute the first portion via the one or more reprogrammable processors. In block 1416, the conveyor belt system may send second data from the one or more reprogrammable processors to the one or more front-end processors. In block 1418, the conveyor belt system may determine, based on the first data and second data, result data.

The conveyor belt system may determine, based on computational complexity, the first portion of the program to run in hardware. The result data may be a result of execution of the program. The second data may be derived from the first data based on the one or more transformations. The result data may be derived from the second data, and the second data may be derived from the first data. The one or more reprogrammable processors may be a field programmable gate array. Sending the first data from the one or more front-end processors to the one or more reprogrammable processors may further comprise sending the first data, via an expansion bus, from the one or more front-end processors to the one or more reprogrammable processors. Receiving a program configured to run as software may further comprise compiling the program into executable software code, a hardware configuration, and communication code for transferring data between the executable software code and the hardware configuration.

A conveyor belt processor may comprise an input data bus, a plurality of interconnected reprogrammable operator blocks, and an output data bus. The plurality of interconnected reprogrammable operator blocks may comprise an input data bus, of a first reprogrammable operator block, coupled to an output data bus, of a second reprogrammable operator block, or the input data bus; an output data bus, of a first reprogrammable operator block, coupled to an input data bus, of a third reprogrammable operator block, or an output data bus; and one or more transformation functions that take input data from a prior data bus, performs one or more transformations on the input data, and outputs transformed input data via an output data bus.

A bus width of the plurality of interconnected reprogrammable operator blocks may not be the same. An output of a subsequent block may be an input of a previous block. The second reprogrammable operator block and the third reprogrammable operator block may be the same. The third reprogrammable operator block may be prior to the first reprogrammable operator block in execution order. The conveyor belt processor may further comprise a programming interface configured to receive instructions for creating the plurality of interconnected reprogrammable operator blocks.

A system for processing data may comprise a plurality of processors, and a management function, wherein the management function is configured to assign data to each processor. Each processor may comprise an input data bus; a plurality of interconnected reprogrammable operator blocks, and an output data bus. The interconnected reprogrammable operator blocks may comprise: an input data bus, of a first reprogrammable operator block, coupled to an output data bus, of a second reprogrammable operator block, or the input data bus; an output data bus, of a first reprogrammable operator block, coupled to an input data bus, of a third reprogrammable operator block, or an output data bus; and one or more transformation functions that take input data from a prior data bus, performs one or more transformations on the input data, and outputs transformed input data via an output data bus.

The management function may be further configured to reconfigure the plurality of interconnected reprogrammable operator blocks. The management function may comprise memory storing instructions to create the plurality of interconnected reprogrammable operator blocks of the plurality of processors. The system of claim may further comprise at least one front-end processor with an architecture different than the plurality of processors. The at least one front-end processor may comprise a general-purpose processor. The management function may comprise: a secure interface configured to receive configuration changes; and an insecure interface configured to assign data to one or more processors of the plurality of processors.

Figure 15:
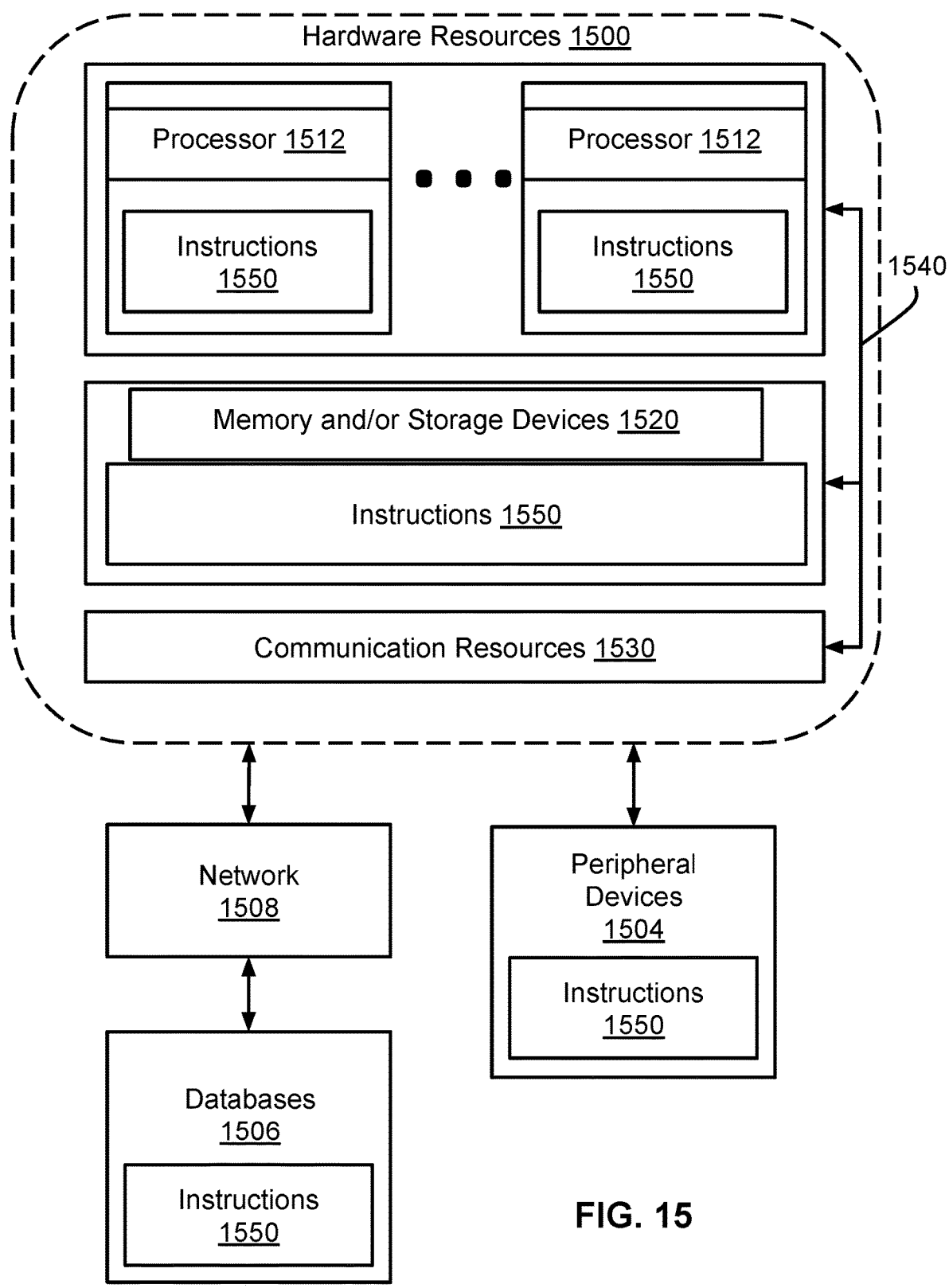
FIG. 15 is a block diagram illustrating a computing system and components.

FIG. 15 is a block diagram illustrating components, according to some example embodiments, able to read instructions from a machine-readable or computer-readable medium (e.g., a machine-readable storage medium) and perform any one or more of the methodologies discussed herein. Specifically, FIG. 15 shows a diagrammatic representation of hardware resources 1500 including one or more processors (or processor cores) 1510, one or more memory/storage devices 1520, and one or more communication resources 1530, each of which are communicatively coupled via a bus 1540.

The processors 1510 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1512 and a processor 1514. The memory/storage devices 1520 may include main memory, disk storage, or any suitable combination thereof.

The communication resources 1530 may include interconnection and/or network interface components or other suitable devices to communicate with one or more peripheral devices 1504 and/or one or more databases 1506 via a network 1508. For example, the communication resources 1530 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 1550 may comprise software, a program, an application, an applet, an app, or other executable code for causing at least any of the processors 1510 to perform any one or more of the methodologies discussed herein. The instructions 1550 may reside, completely or partially, within at least one of the processors 1510 (e.g., within the processor's cache memory), the memory/storage devices 1520, or any suitable combination thereof. Furthermore, any portion of the instructions 1550 may be transferred to the hardware resources 1500 from any combination of the peripheral devices 1504 and/or the databases 1506. Accordingly, the memory of processors 1510, the memory/storage devices 1520, the peripheral devices 1504, and the databases 1506 are examples of computer-readable and machine-readable media.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general-purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices.

Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/aspects/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

What is claimed is:

1. A method of configuring a processor, the method comprising:
    receiving a program configured to run as software;
    determining a first portion of the program to run in hardware, and a second portion of the program to run as software;
    determining, based on the first portion, a plurality of interconnected reprogrammable operator blocks, comprising one or more transformation functions that take input data from a prior data bus, performs one or more transformations on the input data, and outputs transformed input data via an output data bus;
    configuring the plurality of interconnected reprogrammable operator blocks to execute on one or more reprogrammable processors;
    executing the second portion via one or more front-end processors;
    sending first data from the one or more front-end processors to the one or more reprogrammable processors;
    executing the first portion via the one or more reprogrammable processors;
    sending second data from the one or more reprogrammable processors to the one or more front-end processors; and
    determining, based on the first data and second data, result data.

2. The method of claim 1, wherein determining a first portion further comprises determining, based on computational complexity, the first portion of the program to run in hardware.

3. The method of claim 1, wherein the result data is a result of execution of the program.

4. The method of claim 1, wherein the second data is derived from the first data based on the one or more transformations.

5. The method of claim 1, wherein the result data is derived from the second data, and the second data is derived from the first data.

6. The method of claim 1, wherein the one or more reprogrammable processors is a field programmable gate array.

7. The method of claim 1, wherein sending the first data from the one or more front-end processors to the one or more reprogrammable processors further comprises sending the first data, via an expansion bus, from the one or more front-end processors to the one or more reprogrammable processors.

8. The method of claim 1, wherein receiving a program configured to run as software further comprises compiling the program into executable software code, a hardware configuration, and communication code for transferring data between the executable software code and the hardware configuration.

9. A conveyor belt processor, comprising:
    an input data bus;
    a plurality of interconnected reprogrammable operator blocks, comprising:

an input data bus, of a first reprogrammable operator block, coupled to an output data bus, of a second reprogrammable operator block, or the input data bus;

an output data bus, of a first reprogrammable operator block, coupled to an input data bus, of a third reprogrammable operator block, or an output data bus; and one or more transformation functions that take input data from a prior data bus, performs one or more transformations on the input data, and outputs transformed input data via an output data bus; and the output data bus.

10. The conveyor belt processor of claim 9, wherein a bus width of the plurality of interconnected reprogrammable operator blocks are not the same.

11. The conveyor belt processor of claim 9, wherein an output of a subsequent block is an input of a previous block.

12. The conveyor belt processor of claim 9, wherein the second reprogrammable operator block and the third reprogrammable operator block are the same.

13. The conveyor belt processor of claim 9, wherein the third reprogrammable operator block are prior to the first reprogrammable operator block in execution order.

14. The conveyor belt processor of claim 9, further comprising a programming interface configured to receive instructions for creating the plurality of interconnected reprogrammable operator blocks.

15. A system for processing data, comprising:
a plurality of processors, each processor comprising:
an input data bus;
a plurality of interconnected reprogrammable operator blocks, comprising:
an input data bus, of a first reprogrammable operator block, coupled to an output data bus, of a second reprogrammable operator block, or the input data bus;
an output data bus, of a first reprogrammable operator block, coupled to an input data bus, of a third reprogrammable operator block, or an output data bus; and
one or more transformation functions that take input data from a prior data bus, performs one or more transformations on the input data, and outputs transformed input data via an output data bus; and
the output data bus; and
a management function, wherein the management function is configured to assign data to each processor.

16. The system of claim 15, wherein the management function is further configured to reconfigure the plurality of interconnected reprogrammable operator blocks.

17. The system of claim 15, wherein the management function comprises memory storing instructions to create the plurality of interconnected reprogrammable operator blocks of the plurality of processors.

18. The system of claim 15, further comprising at least one front-end processor with an architecture different than the plurality of processors.

19. The system of claim 18, wherein the at least one front-end processor comprises a general-purpose processor.

20. The system of claim 15, wherein the management function comprises:
a secure interface configured to receive configuration changes; and
an insecure interface configured to assign data to one or more processors of the plurality of processors.

* * * * *